US010778022B2

(12) United States Patent
Reinger

(10) Patent No.: US 10,778,022 B2
(45) Date of Patent: Sep. 15, 2020

(54) MULTI-PURPOSE POWER BANK

(71) Applicant: Tecflower AG, Feusisberg (CH)

(72) Inventor: Sascha Reinger, Feusisberg (CH)

(73) Assignee: TECFLOWER AG, Feusisberg (CH)

( * ) Notice: Subject to any disclaimer, the term of this patent is extended or adjusted under 35 U.S.C. 154(b) by 0 days.

(21) Appl. No.: 16/593,759

(22) Filed: Oct. 4, 2019

(65) Prior Publication Data

US 2020/0112187 A1    Apr. 9, 2020

(30) Foreign Application Priority Data

Oct. 5, 2018  (CH) ..................... 1221/18

(51) Int. Cl.
| | |
|---|---|
| *H04B 1/38* | (2015.01) |
| *H02J 7/00* | (2006.01) |
| *H02J 7/34* | (2006.01) |
| *F21V 33/00* | (2006.01) |
| *G08B 5/36* | (2006.01) |
| *H02J 7/02* | (2016.01) |
| *H04B 5/00* | (2006.01) |

(Continued)

(52) U.S. Cl.
CPC ........ *H02J 7/0045* (2013.01); *F21V 33/0004* (2013.01); *G08B 5/36* (2013.01); *H02J 7/025* (2013.01); *H02J 7/342* (2020.01); *H04B 5/0037* (2013.01); *F21Y 2103/10* (2016.08); *F21Y 2115/10* (2016.08)

(58) Field of Classification Search
CPC .......... H02J 7/0045; H02J 7/342; H02J 7/025; F21V 33/0004; G08B 5/36; H04B 5/0037

USPC .................................................. 455/572, 573
See application file for complete search history.

(56) References Cited

U.S. PATENT DOCUMENTS

| | | | | |
|---|---|---|---|---|
| 2015/0115870 | A1* | 4/2015 | Vance ..................... | G04G 21/00 320/101 |
| 2015/0295437 | A1* | 10/2015 | Wang ...................... | H02J 50/10 455/573 |

(Continued)

FOREIGN PATENT DOCUMENTS

| | | |
|---|---|---|
| AU | 2016101307 A4 | 9/2016 |
| DE | 202013007828 U1 | 12/2013 |

(Continued)

*Primary Examiner* — Ankur Jain
*Assistant Examiner* — Max Mathew
(74) *Attorney, Agent, or Firm* — Paul D. Bianco; Gary S. Winer; Fleit Intellectual Property Law

(57) ABSTRACT

A housing of a power bank includes fasteners for coupling the power bank to a mobile phone. The housing comprises a illumination element and a charging element for wirelessly charging the mobile phone. An added benefit, which convinces users to carry a mobile phone and the power bank connected to one another is that the illumination element can be controlled manually and/or wirelessly by a wireless connection through the mobile phone, such that light can be emitted from the power bank front side in the direction of a transverse axis, and the fasteners are designed to be permanently magnetic and/or mechanically designed such that a releasable attachment, that can be pivoted about a transverse axis, of the power bank is achieved relative to the mobile phone, such that the housing is mounted to be pivotable between a neutral coupling position and a pivoted selfie position relative to the mobile phone.

11 Claims, 3 Drawing Sheets

(51) Int. Cl.
*F21Y 103/10* (2016.01)
*F21Y 115/10* (2016.01)

(56) References Cited

U.S. PATENT DOCUMENTS

| | | | |
|---|---|---|---|
| 2016/0087668 A1* | 3/2016 | Ben Abdelaziz | H04B 1/3883 455/41.1 |
| 2016/0127011 A1* | 5/2016 | Phillips | H04B 1/3883 455/41.1 |
| 2016/0134142 A1* | 5/2016 | Murphy | H02J 50/10 455/573 |
| 2016/0142110 A1* | 5/2016 | Park | H04B 5/0087 455/573 |
| 2016/0165022 A1* | 6/2016 | Portugal | H02J 7/35 455/573 |
| 2016/0254678 A1* | 9/2016 | Standke | H02J 5/005 455/573 |
| 2016/0259374 A1* | 9/2016 | Breiwa | H01F 7/0252 |
| 2016/0301229 A1* | 10/2016 | Chao | H02J 7/0045 |
| 2019/0011089 A1* | 1/2019 | Whiting | F02N 11/12 |
| 2019/0027949 A1* | 1/2019 | Critelli | G04G 19/00 |
| 2020/0044468 A1* | 2/2020 | Lin | H02J 7/0047 |

FOREIGN PATENT DOCUMENTS

| | | |
|---|---|---|
| DE | 202014005389 U1 | 8/2014 |
| DE | 202015101248 U1 | 8/2015 |
| DE | 202016105623 U1 | 11/2016 |

\* cited by examiner

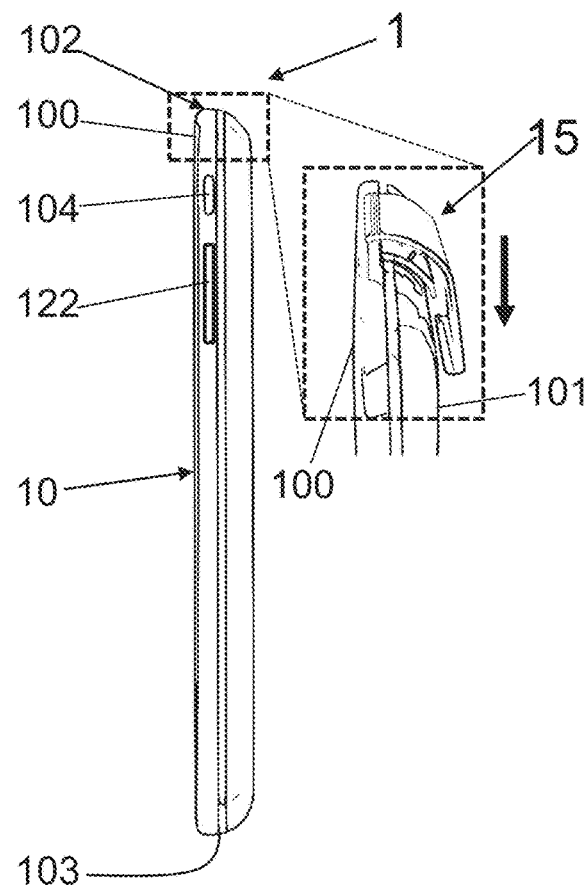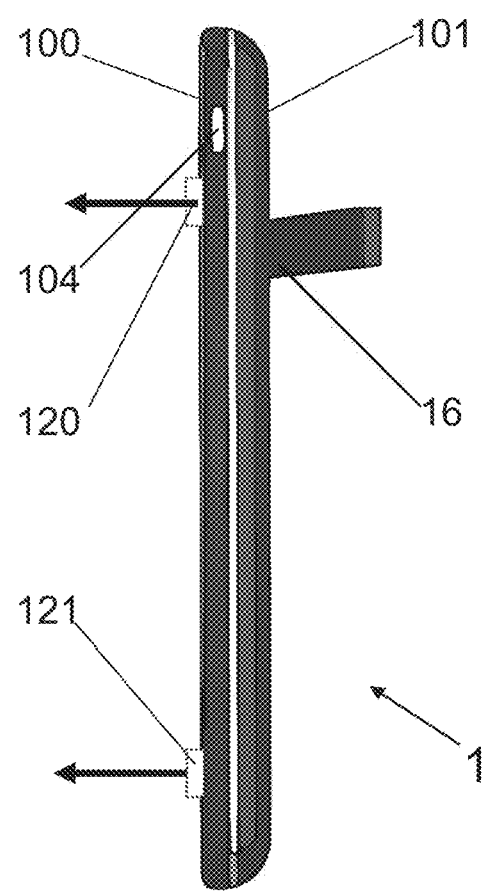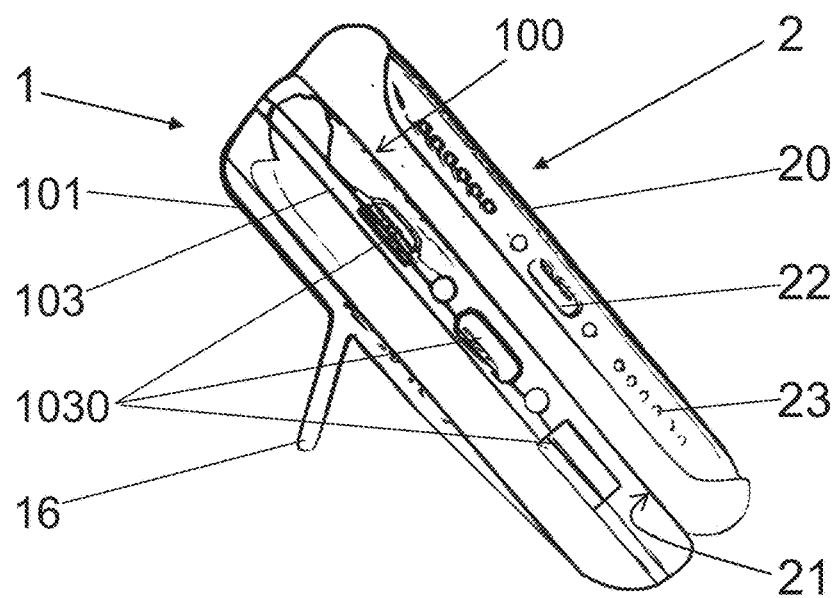

MULTI-PURPOSE POWER BANK

TECHNICAL FIELD

The disclosure relates to a multi-purpose power bank, comprising a housing having a power bank front side and a power bank rear side opposite the power bank front side, wherein the housing has fasteners for coupling the power bank front side to a mobile phone rear side of a mobile phone and the housing comprises charging means for wirelessly charging the mobile phone and at least one illumination means.

BACKGROUND

Smartphones, which are defined as internet-compatible mobile phones with a touch-sensitive screen, are widespread nowadays and the number of users continues to go up. Smartphones are sold by a variety of companies with different operating systems and applications, called apps, and have a wide range of features, also including being able to create pictures and videos.

In general, mobile emergency chargers for charging smartphones on the go are known as power banks. These power banks comprise an energy storage system and electronics in order to be able to charge smartphones on the go. As such, a power bank is not a typical stationary charger, but rather can be taken with you. Such power banks are intended to extend the usage time of smartphones and to guarantee use of the device largely regardless of the respective state of charge. A rechargeable lithium polymer battery having a high capacity is usually installed in the housing of a power bank and there are different connections on the housing.

In various purchasing portals online, power banks for the emergency charging of smartphones in particular can be found, which as well as a simple charging function have further features such as a torch, as described in AU2016101307, laser pointer, solar cells, hand warmer, compass, smartphone holder or a data store, as described in DE202015101248. Customary power banks are available in a wide variety of designs, in the form of a music cassette, a bag, an action figure, a winder for manual charging, as cited in DE202016105623, as a table lamp or in a simple design with a stable, rectangular housing. Cable connections are known, with which the energy storage system of the power bank can be connected to a smartphone.

Power banks are increasingly also being used for charging mobile devices wirelessly, wherein various techniques can be used, as listed in DE202015101248, although the Qi standard, as cited by way of example in DE202014005389, has generally prevailed. In order to enhance user-friendliness, power banks which have the option of charging smartphones wirelessly are very attractive for the smartphone user owing to the lack of wires. It is therefore evident that the power banks increasingly together with the coupled smartphone can be carried along and also are carried along with the smartphone during charging. There are power banks which, after being coupled to a smartphone, can be taken with you on the go with this smartphone. With the option of wireless charging, the smartphone is placed onto the Qi power bank and additionally held magnetically or by suction cups, as described in DE202013007828. Taking the smartphone together with power bank with you is readily possible, wherein a clunky construction results, the power bank is connected as securely as possible to the smartphone and is only used for charging.

If additional features are available, they are designed independently of the smartphone, such that a compass or an illumination device or a video player/power bank combination, as disclosed in US20160301229, have no effect on the use of the smartphone. Even if the power bank is equipped with an illumination device, is there no functional coupling to a smartphone, wherein the smartphone and power bank are used independently of each other. Neither a physical nor a functional coupling of the power bank to the smartphone is available.

Currently available power banks are still, in general, standalone partially clunky energy storage systems which are separate from the smartphone, without an additional functional benefit coupled to the smartphone, alongside the option of charging.

SUMMARY

One aspect of the disclosure relates to a multi-purpose power bank which convinces users to carry a smartphone and the multi-purpose power bank connected to one another, wherein an additional feature, alongside charging, is available to the smartphone. Beyond the option of charging, the power bank can be connected to a smartphone and delivers an additional benefit when using the smartphone.

This aspect can be achieved in that a new feature when using the smartphone is available to the user by coupling the releasably attached multi-purpose power bank. This additional feature increases the acceptability of carrying the multi-purpose power bank and the smartphone connected to one another for a prolonged period. Conventional power banks cannot offer this additional feature or these additional features.

Not only is a new specific coupling device created, but the coupling of the multi-purpose power bank on the smartphone also provides additional features.

BRIEF DESCRIPTION OF THE DRAWINGS

Further features, details and preferences of the disclosure will become apparent from the following description of preferred embodiments as well as the drawings. In the drawings.

FIG. 2a shows a side view of a multi-purpose power bank, on which a belt clip can be attached, whereas FIG. 2b shows a side view of a multi-purpose power bank having an attached and fold-out table top stand.

FIG. 3 shows a side view of a mobile phone coupled to a multi-purpose power bank, wherein this sandwich is held by the table top stand on a surface.

FIG. 4a shows a schematic perspective view of a mobile phone multi-purpose power bank combination in a first coupling position, whereas

DETAILED DESCRIPTION

The multi-purpose power bank 1 described below comprises a housing 10, which is designed here to be substantially rectangular with rounded corners. The multi-purpose power bank 1 is a mobile emergency charger for coupling to mobile phones or in general portable computers. The chosen shape here of the multi-purpose power bank 1 resembles the outer design of many mobile phones, such that the multi-purpose power bank 1 is mounted to be pivotable and able to be coupled in a manner largely concealed by the mobile phone, after coupling to a mobile phone described below. However, differently shaped housings 10, by way of example with a round or elliptical cross-sectional area, can also be selected.

Figure 1A:
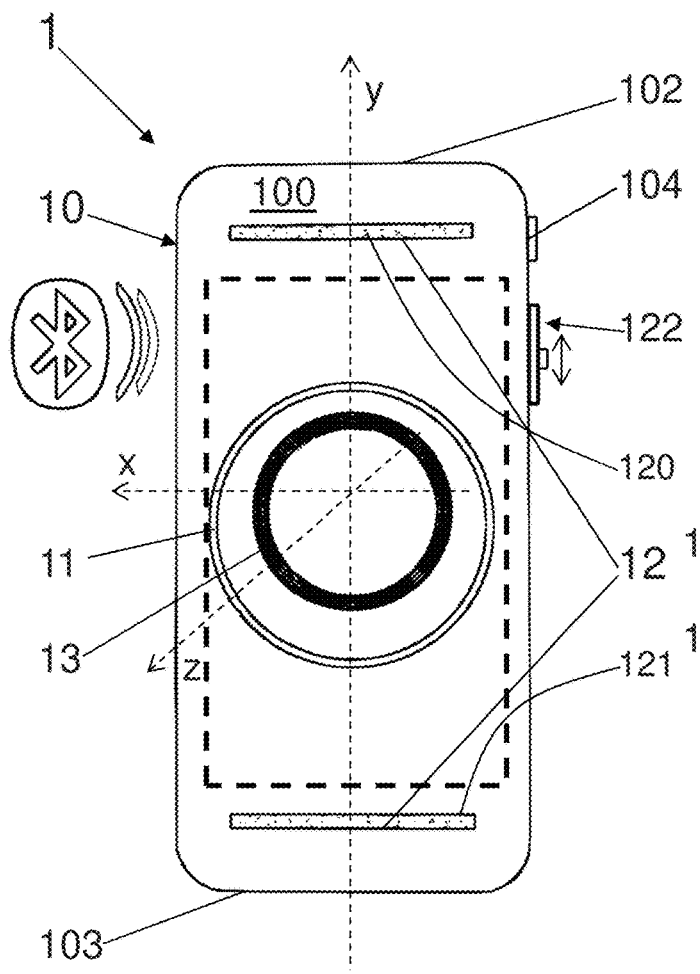
FIG. 1a shows a schematic front view of a multi-purpose power bank, whereas FIG. 1b schematically shows a rear side of a multi-purpose power bank
Figure 1B:
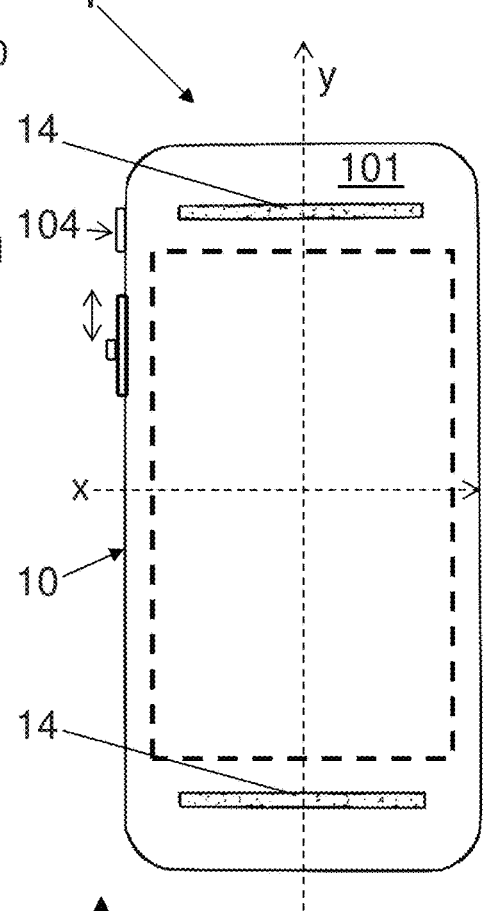
FIG. 1c shows a multi-purpose power bank with a view in the y-direction to a base side of the housing of the multi-purpose power bank.

In order to outline a possible pivoting of the multi-purpose power bank 1 or of a coupled mobile phone relative to one another, the three spatial directions x, y, z are indicated in FIG. 1a. A later relative pivoting takes place about the z-axis protruding from the x-y-plane of the multi-purpose power bank 1.

The multi-purpose power bank 1 and/or the housing 10 have a power bank front side 100, a power bank rear side 101, as well as an end face 102 and a base side 103. The multi-purpose power bank 1 has an on/off button 104 and an intensity control button 122 on the housing 10, in this case on a side. A rechargeable battery with the highest possible capacity is installed within the housing 10, which battery is indicated by dashed lines here. Although charging electronics and electronics for controlling the additional benefit described below are available in the housing 10, they are not represented here. The "Bluetooth" symbol indicates that the multi-purpose power bank 1 can also be wirelessly controlled by a mobile phone, wherein the electronics are correspondingly equipped.

A mobile phone should be able to be coupled to the power bank front side 100. For this purpose, fasteners 11 are provided on or in the housing 10. The fasteners 11 can optionally have different mechanical designs or be permanently magnetic. In this case, a permanently magnetic ring 11 is inserted inside the housing 10 and thus stored away unseen during operation in the housing 10. Alongside a continuous ring, ring segments or disc-shaped permanent magnets with different cross-sectional areas can also be used. A circular design is advantageous in order to facilitate a rotation of a mobile phone or the multi-purpose power bank 1 after coupling.

Charging a mobile phone or smartphone, the principle object of the multi-purpose power bank 1, is achieved by charging means 13, which are connected to the internal rechargeable battery or the associated charging electronics. In this case, charging is preferably achieved inductively using at least one induction coil 13, which is likewise mounted in the housing 10 so as to be concealed. Wire-based charging of the mobile phone battery is, however, also possible using the means described in FIG. 1c.

The feature of interest here, enhancing the performance of a mobile phone, is achieved by front side illumination means 12 and/or by rear side illumination means 14 arranged on the power bank rear side 101.

Two LED bars 12, a first LED bar 120 and a second LED bar 121, are arranged here as front side illumination means 12. The front side illumination means 12 emit light away from the housing 10 and the power bank front side 100 in the triggered state. Similar LED bars can be used as rear side illumination means 14, which emit light away from the power bank rear side 101 in a controllable manner, wherein likewise electronics, which can be operated manually or via a coupled mobile phone, must be available for the rear side illumination means 14.

The multi-purpose power bank 1 or the front side illumination means 12 and/or rear side illumination means 14 can be manually operated by adjustment means 104, 122 and can be operated in a manner controlled by the mobile phone by an electronic coupling of a mobile phone to the multi-purpose power bank 1, by means of a wire or wirelessly.

In this case, either an adjustable continuous illumination or a flash-type illumination by the front side illumination means 12 and/or the rear side illumination means 14 can be set manually or via a mobile phone. This additional function is applicable as soon as a mobile phone has been coupled at least electronically, via wires or wirelessly to the multi-purpose power bank 1.

Figure 1C:
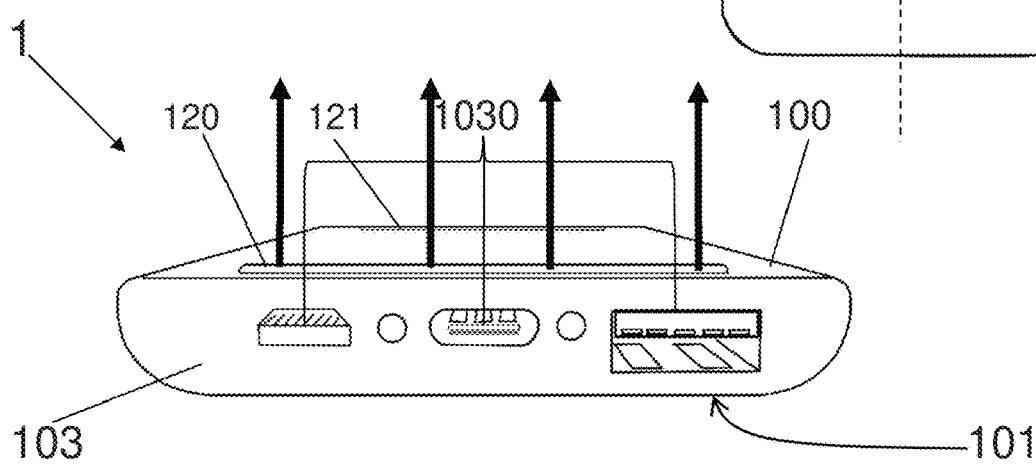

Possible charging connections 1030 for charging a mobile phone using the multi-purpose power bank 1, are illustrated in FIG. 1c, wherein common socket types for all types of mobile phones can be used. The charging connections 1030 are arranged in this case on the base side 103 and designed as various micro USB ports (A, B, C). The light emission of the first LED bar 120 from the power bank front side 100 is indicated by the solid arrows. The sockets are adapted to common mobile devices and the arrangement guarantees an interference-free emission of light from the power bank front side 100 at all times.

In order to facilitate the transport of the multi-purpose power bank 1, with or without a coupled mobile phone, a belt clip 15 is provided, which is arranged on the housing 10, preferably in the region of the end face 102. This belt clip 15 is attached so as to be moved in the direction of the housing 10, as indicated with the arrow in the detailed view. The multi-purpose power bank 1 can thus be comfortably worn on a belt.

Moreover, a table top stand 16 can be attached releasably or non-releasably on the housing 10. The multi-purpose power bank 1 can be easily mounted on a table with or without a coupled mobile phone by folding out the table top stand 16, wherein a mobile phone screen remains readily visible.

The physical coupling of a mobile phone 2, which could also be a smartphone or tablet, is shown in FIG. 3. The combination of multi-purpose power bank 1 and mobile phone 2 is placed on a surface so as to be inclined thanks to the folded-out table top stand 16. Whereas a screen side 20 of the mobile phone 2 is arranged on the side facing away from the multi-purpose power bank 1, a mobile phone rear side 21 directly points towards the power bank front side 100. In this case, a socket 22 for charging or exchanging data, as well as a loud speaker 23, are illustrated on a base side of the mobile phone 2 and continue to be accessible after coupling.

As a result of the permanently magnetic fasteners 11, the mobile phone 2 is held in a magnetically rotatable and releasable manner. Many mobiles phones 2 available today have an operatively connected ferromagnetic or permanently magnetic insert in their housing, such that the permanently magnetic attachment can take place without further measures on the mobile phone 2. Alternatively, a ferromagnetic or permanently magnetic insert can be inserted into the housing of the mobile phone 2. Since popular mobile phones 2 today have also taken precautions for wireless charging and meet the Qi standard for inductive energy transfer, no measures for wireless charging have to be adopted here either. Retrofitting means are, however, also available in order to prepare older mobile phones for wireless charging.

With the additional feature of the multi-purpose power bank 1, photography is in particular supported with the coupled mobile phone 2, leading to better results.

The multi-purpose power bank 1 offers a significant additional benefit, in particular with taking self-portraits or pictures of yourself, so-called selfies.

If the mobile phone 2 is mechanically or magnetically coupled to the multi-purpose power bank 1, the multi-purpose power bank 1 can be moved into a neutral coupling position I. In this neutral coupling position I, the multi-purpose power bank 1 and mobile phone 2 are aligned parallel to each other with their longitudinal axes y, such that a compact combination of both devices is achieved, which only has a greater thickness.

As a result of the rotatable design of the fasteners 11, the multi-purpose power bank 1 can be rotated about a transverse axis z relative to the mobile phone 2 and thus moved into a pivoted selfie position II. In the selfie position II, the multi-purpose power bank 1 is rotated about a pivoting angle of approximately 90° relative to the mobile phone 2. Preferably, the pivoting angle can be adjusted around the transverse axis z between ±80° and ±100°, such that the user can have adequate illumination.

Figure 4A:
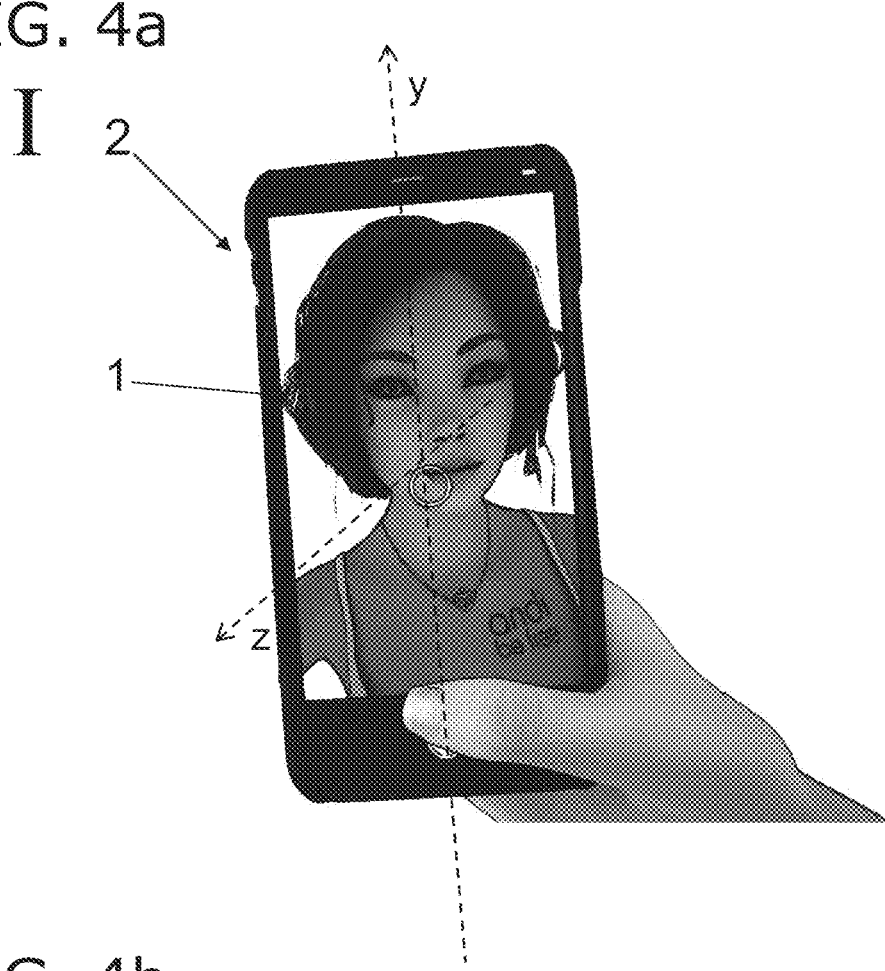
Figure 4B:
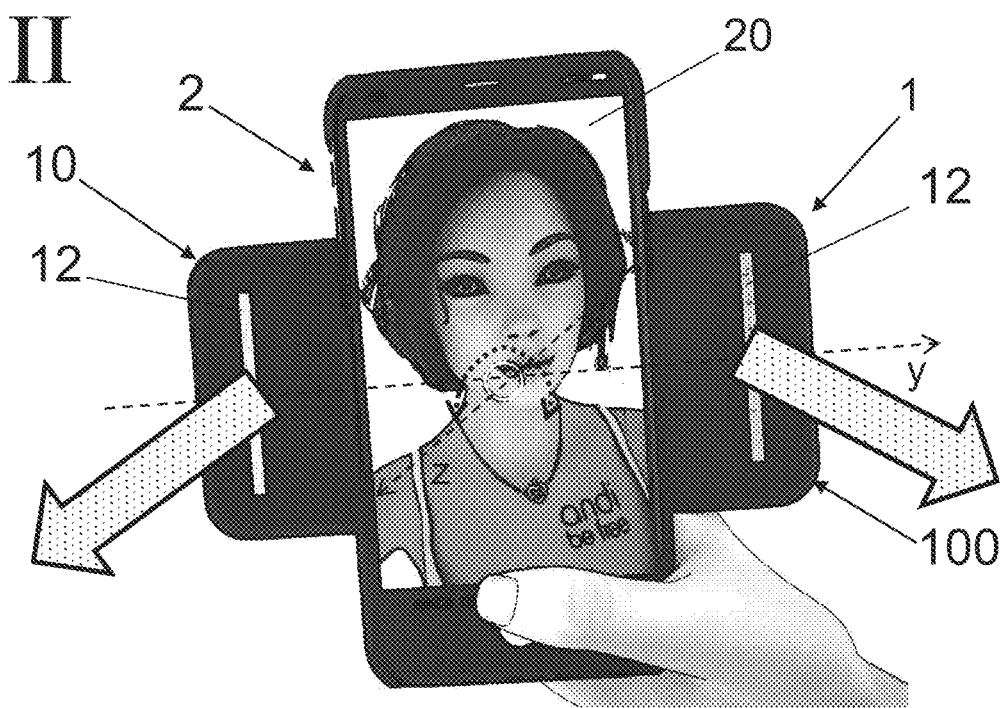
FIG. 4b shows the multi-purpose power bank in a pivoted selfie position, in a pivoting angle of approximately 90°.

As can be clearly seen in FIG. 4b, the front side illumination means 12, arranged on the power bank front side 100, in the selfie position II lie directly facing the user of the mobile phone 2. The freely pivoted front side illumination means 12 can emit light unimpeded in the direction of the user of the mobile phone 2 in the z-direction of the multi-purpose power bank 1 and the mobile phone 2, which illuminates the selfie of the user. The type of illumination by the front side illumination means 12 can optionally be set manually or wirelessly by means of the mobile phone 2. In this case, either a continuous illumination or a flash-type illumination can be selected and carried out. The emission of light in the direction of the user or past the screen side 20 of the mobile phone 2 is symbolized by arrows. The resulting selfie is correspondingly much better illuminated.

The attachment of the multi-purpose power bank 1 to the mobile phone 2 must be designed to be releasable and rotatable so that a functional use is possible when taking selfies. This is achieved by fasteners 11 with permanent magnets on the multi-purpose power bank 1 and corresponding means on the mobile phone 2. Further fasteners 11 could be one or more suction cups or mechanically designed rotatable fasteners.

Since the multi-purpose power bank 1 can be releasably connected to the mobile phone 2, the multi-purpose power bank 1 can be physically separated from the mobile phone 2 for illumination purposes even before pictures are taken and used for illuminating an object to be photographed. This can then also take place optionally with the front side illumination means 12 or with rear side illumination means 14, wherein the multi-purpose power bank 1 is held by hand for this purpose or put down for illumination. Since the electronic coupling between the multi-purpose power bank 1 and mobile phone 2 is maintained, the electronic control can continue to function. The triggering of light is controlled electronically for both illumination means 12, 14 wirelessly via the mobile phone or manually by the user by means of an on/off button 104 and/or intensity control button 122.

The front side illumination means 12 and optional rear side illumination means 14 are in this case formed from a plurality of LED bars comprising LEDs. The individual LEDs can be activated and deactivated manually and/or wirelessly by the mobile phone. The LEDs can also be arranged in wavy lines, semicircles or partial ellipses instead of the rectilinear, bar-like shape.

The multi-purpose power bank 1 is in this case designed to be substantially rectangular and has a length which is larger than the width of the smartphone 2. The multi-purpose power bank 1 is thus concealed in the neutral coupling position I by the smartphone 2 and protrudes in the pivoted selfie position II beyond the width of the smartphone, such that the front side illumination means 12 can emit light in the direction of the smartphone user. If the smartphone 2 is designed, as usual, to be substantially rectangular, the multi-purpose power bank 1 could also have an elliptical cross-section.

The multi-purpose power bank 1 can be mechanically held on a smartphone in such a manner, by way of example by known suction cups, that the multi-purpose power bank 1 is released from the rear side of the smartphone, then rotated relative to the smartphone and subsequently mechanically coupled again. The different angular adjustments are thus achieved.

REFERENCE LIST

1 multi-purpose power bank
10 housing
   100 power bank front side
   101 power bank rear side
   102 end face
   103 base side
      1030 charging connection
   104 on/off button
11 fastener (permanent magnet, ring in the interior, concealed)
12 front side illumination means (e.g. stereo flash)
   120 first LED bar
   121 second LED bar
   122 intensity control button (for flash/lamp, manual)
13 charging means (coil in the interior, concealed)
14 rear side illumination means (optional)
15 belt clip (attachable)
16 table top stand (fold-out)
2 smartphone
20 screen side
21 mobile phone rear side
22 socket
23 loud speaker
I neutral coupling position
II pivoted selfie position

The invention claimed is:

1. A multi-purpose power bank comprising a housing having a power bank front side and a power bank rear side opposite the power bank front side,
   wherein the housing has fasteners for coupling the power bank front side to a mobile phone rear side of a mobile phone and the housing comprises charging means for wirelessly charging the mobile phone and at least one illumination means,
   wherein the at least one illumination means is a front side illumination means arranged on the power bank front side, said illumination means controllable manually by an on/off button or an intensity control button and/or wirelessly by a wireless connection through the mobile phone, such that light is emitted from the power bank front side in the direction of a transverse axis, and
   wherein the fasteners are designed to be permanently magnetic and/or mechanically designed in such a manner that a releasable attachment, that can be pivoted about a transverse axis, of the multi-purpose power bank can be achieved relative to the mobile phone, such that the housing is mounted to be pivotable to and fro between a neutral coupling position and a pivoted selfie position relative to the mobile phone when the housing is physically coupled to the mobile phone.

2. The multi-purpose power bank of claim 1, wherein a pivoting angle can be adjusted from the coupling position to the pivoted selfie position around the transverse axis between ±80° and ±100°.

3. The multi-purpose power bank of claim 1, wherein the at least one illumination means comprises a rear side illumination means which is arranged on the power bank rear side and emits light therefrom.

4. The multi-purpose power bank of claim 3, wherein the front side illumination means and/or the rear side illumination means are formed from a plurality of rectilinear LED bars comprising LEDs.

5. The multi-purpose power bank of claim 4, wherein a first LED bar and a second LED bar are arranged spaced apart from one another on the power bank front side.

6. The multi-purpose power bank of claim 4, wherein the LED bars are arranged in wavy lines, semicircles or partial ellipses.

7. The multi-purpose power bank of claim 1, wherein the fasteners are arranged in an interior of the housing and are formed by at least one permanently magnetic ring.

8. The multi-purpose power bank of claim 1, wherein the charging means is designed as at least one induction coil, which is connected to a rechargeable battery or to associated charging electronics in an interior of the housing.

9. The multi-purpose power bank of claim 1, wherein a belt clip is arranged on the housing.

10. The multi-purpose power bank of claim 1, wherein a table top stand is arranged in a fold-out manner on the housing.

11. The multi-purpose power bank of claim 1, wherein wired charging is provided by arranging charging connections on a base side of the housing with suitable sockets, providing an interference-free emission of light from the power bank front side.

* * * * *